United States Patent
Han et al.

(10) Patent No.: US 12,283,689 B2
(45) Date of Patent: *Apr. 22, 2025

(54) PROCESS FOR MAKING A COATED ELECTRODE ACTIVE MATERIAL

(71) Applicant: BASF SE, Ludwigshafen am Rhein (DE)

(72) Inventors: Zhenji Han, Hyogo (JP); Junji Kashiwagi, Yamagata (JP); Suhao Wei, Osaka (JP); Jumpei Nakayama, Yamaguchi (JP); Daisuke Morita, Yamaguchi (JP)

(73) Assignee: BASF SE, Ludwigshafen am Rhein (DE)

(*) Notice: Subject to any disclaimer, the term of this patent is extended or adjusted under 35 U.S.C. 154(b) by 680 days.

This patent is subject to a terminal disclaimer.

(21) Appl. No.: 17/595,862

(22) PCT Filed: Jun. 29, 2020

(86) PCT No.: PCT/EP2020/068192
§ 371 (c)(1),
(2) Date: Nov. 29, 2021

(87) PCT Pub. No.: WO2021/001293
PCT Pub. Date: Jan. 7, 2021

(65) Prior Publication Data
US 2022/0320496 A1  Oct. 6, 2022

(30) Foreign Application Priority Data
Jul. 2, 2019  (EP) ..................................... 19183847

(51) Int. Cl.
H01M 4/36 (2006.01)
H01M 4/04 (2006.01)
H01M 4/505 (2010.01)
H01M 4/525 (2010.01)
H01M 4/02 (2006.01)

(52) U.S. Cl.
CPC ......... *H01M 4/366* (2013.01); *H01M 4/0402* (2013.01); *H01M 4/505* (2013.01); *H01M 4/525* (2013.01); *H01M 2004/028* (2013.01)

(58) Field of Classification Search
None
See application file for complete search history.

(56) References Cited

U.S. PATENT DOCUMENTS

| 11,390,534 B2 | 7/2022 | Aihara et al. | |
| 12,057,577 B2 | 8/2024 | Choi et al. | |
| 12,119,475 B2* | 10/2024 | Han | H01M 10/0525 |
| 2005/0153206 A1* | 7/2005 | Oesten | H01M 4/505 |
| | | | 252/182.1 |
| 2015/0372298 A1* | 12/2015 | Fujieda | C03C 3/21 |
| | | | 429/246 |
| 2016/0079634 A1* | 3/2016 | Onodera | H01M 4/0471 |
| | | | 429/49 |
| 2016/0301069 A1 | 10/2016 | Kwak et al. | |
| 2020/0373560 A1* | 11/2020 | Campbell | H01M 4/1391 |

FOREIGN PATENT DOCUMENTS

| CN | 109 755 547 A | 5/2019 |
| JP | 2019114327 A | 7/2019 |
| JP | 2019139889 A | 8/2019 |
| KR | 2018 0010122 A | 1/2018 |
| WO | WO 2019/011786 A1 | 1/2019 |

OTHER PUBLICATIONS

International Search Report dated Jul. 28, 2020, PCT/EP2020/068192.

* cited by examiner

*Primary Examiner* — Alix E Eggerding
(74) *Attorney, Agent, or Firm* — Armstrong Teasdale LLP

(57) ABSTRACT

Process for making a partially coated electrode active material wherein said process comprises the following steps: (a) Providing an electrode active material according to general formula $Li_{1+x}TM_{1-x}O_2$, wherein TM is Ni and, optionally, at least one of Co and Mn, and, optionally, at least one element selected from Al, Mg, Ba and B, transition metals other than Ni, Co, and Mn, and x is in the range of from zero to 0.2, wherein at least 50 mole-% of the transition metal of TM is Ni, (b) treating said electrode active material with an aqueous medium, (c) partially removing water by solid-liquid separation method, (d) treating the residue with a compound of Me, Me being selected from at least one of aluminum, boron, phosphorus, antimony, magnesium, vanadium, and tellurium, and (e) treating the residue thermally.

14 Claims, No Drawings

PROCESS FOR MAKING A COATED ELECTRODE ACTIVE MATERIAL

This application is a national stage filing under 35 U.S.C. § 371 of International Application No. PCT/EP2020/068192, filed on Jun. 29, 2020, which claims the benefit of priority to European Application No. 19183847.3, filed Jul. 2, 2019; the disclosure of each of these applications are each incorporated herein by reference in their entirety.

The present invention is directed towards a process for making a partially coated electrode active material wherein said process comprises the following steps:

(a) Providing an electrode active material according to general formula $Li_{1+x}TM_{1-x}O_2$, wherein TM is Ni and, optionally, at least one of Co and Mn, and, optionally, at least one element selected from Al, Mg, Ba and B, transition metals other than Ni, Co, and Mn, and x is in the range of from −0.05 to 0.2, wherein at least 50 mole-% of the transition metal of TM is Ni, (b) treating said electrode active material with an aqueous medium, (c) partially removing water by solid-liquid separation method, (d) treating the residue with a compound of Me, Me being selected from at least one of aluminum, boron, phosphorus, molybdenum, antimony, vanadium, and tellurium, and (e) treating the residue thermally.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 75 mole-% or more of Ni, referring to the total TM content.

One problem of lithium ion batteries—especially of Ni-rich electrode active materials—is attributed to undesired reactions on the surface of the electrode active materials. Such reactions may be a decomposition of the electrolyte or the solvent or both. It has thus been tried to protect the surface without hindering the lithium exchange during charging and discharging. Examples are attempts to coat the electrode active materials with, e.g., aluminium oxide or calcium oxide, see, e.g., U.S. Pat. No. 8,993,051.

Other theories assign undesired reactions to free LiOH or $Li_2CO_3$ on the surface. Attempts have been made to remove such free LiOH or $Li_2CO_3$ by washing the electrode active material with water, see, e.g., JP 4,789,066 B, JP 5,139,024 B, and US2015/0372300. However, in some instances it was observed that the properties of the resultant electrode active materials did not improve.

It was an objective of the present invention to provide a process for making Ni-rich electrode active materials with excellent electrochemical properties. It was also an objective to provide Ni-rich electrode active materials with excellent electrochemical properties.

Accordingly, the process defined at the outset has been found, hereinafter also referred to as "inventive process". The inventive process comprises the following steps:

(a) Providing an electrode active material according to general formula $Li_{1+x}TM_{1-x}O_2$, wherein TM is Ni and, optionally, at least one of Co and Mn, and, optionally, at least one element selected from Al, Mg, Ba and B, transition metals other than Ni, Co, and Mn, and x is in the range of from −0.05 to 0.2, wherein at least 50 mole-% of the transition metal of TM is Ni, (b) treating said electrode active material with an aqueous medium, (c) partially removing water by solid-liquid separation method, (d) treating the residue with a compound of Me, Me being selected from at least one of molybdenum, antimony, vanadium, and tellurium, and (e) treating the residue thermally.

The inventive process comprises five steps, (a), (b), (c), (d), and (e), in the context of the present invention also referred to as step (a) and step (b) and step (c) and step (d) and step (e), respectively. The commencement of steps (b) and (c) may be simultaneously or preferably subsequently. Steps (b) and (c) may be performed simultaneously or subsequently or, preferably, at least partially overlapping or simultaneously. Step (d) is performed after completion of step (c).

The inventive process starts off from an electrode active material according to general formula $Li_{1+x}TM_{1-x}O_2$, wherein TM comprises Ni and, optionally, at least one transition metal selected from Co and Mn, and, optionally, at least one element selected from Al, Ba, B, and Mg and, wherein at least 50 mole-% of TM is Ni, preferably at least 75 mole-%, and x is in the range of from −0.05 to 0.2. Said material is hereinafter also referred to as starting material.

In one embodiment of the present invention the starting material has an average particle diameter (D50) in the range of from 3 to 20 µm, preferably from 5 to 16 µm. The average particle diameter can be determined, e.g., by light scattering or LASER diffraction or electroacoustic spectroscopy. The particles are usually composed of agglomerates from primary particles, and the above particle diameter refers to the secondary particle diameter.

In one embodiment of the present invention, the starting material has a specific surface (BET), hereinafter also referred to as "BET surface", in the range of from 0.1 to 1.0 $m^2/g$. The BET surface may be determined by nitrogen adsorption after outgassing of the sample at 200° C. for 30 minutes or more and beyond this accordance with DIN ISO 9277:2010.

In one embodiment of the present invention, the particulate material provided in step (a) has a moisture content in the range of from 20 to 2,000 ppm, determined by Karl-Fischer titration, preferred are 20 to 1,200 ppm.

In one embodiment of the present invention, the variable TM corresponds to general formula (I a)

$$(Ni_aCo_bMn_c)_{1-d}M^1_d \quad \text{(I a)}$$

with a+b+c=1 and a being in the range of from 0.75 to 0.95, preferably from 0.85 to 0.95, b being in the range of from 0.025 to 0.2, preferably from 0.025 to 0.1, c being in the range of from 0.025 to 0.2, preferably 0.05 to 0.1, d being in the range of from zero to 0.1, preferably from zero to 0.04, $M^1$ is at least one of Al, Mg, W, Mo, Ti or Zr, preferably at least one of Al, Ti and W.

In one embodiment of the present invention, the variable c is zero, $M^1$ is Al and d is in the range of from 0.01 to 0.05.

In another embodiment of the present invention, the variable TM corresponds to general formula (I b)

 (I b)

with a*+b*+c*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Ti or Zr.

The variable x is in the range of from −0.05 to 0.2.

In one embodiment of the present invention TM corresponds to general formula (I a) and x is in the range from −0.05 to 0.2, preferably from zero to 0.1 and even more preferably 0.01 to 0.05.

In one embodiment of the present invention TM corresponds to general formula (I b) and x is in the range of from −0.05 to zero.

The electrode active material provided in step (a) is usually free from conductive carbon, that means that the conductive carbon content of starting material is less than 1% by weight, referring to said starting material, preferably 0.001 to 1.0% by weight.

Some elements are ubiquitous. In the context of the present invention, traces of ubiquitous metals such as sodium, calcium, iron or zinc, as impurities will not be taken into account in the description of the present invention. Traces in this context will mean amounts of 0.02 mol-% or less, referring to the total metal content of the starting material.

In step (b), said electrode active material provided in step (a) is treated with an aqueous medium, preferably with water. Said aqueous medium may have a pH value in the range of from 2 up to 14, preferably at least 3.5, more preferably from 5 to 7. The pH value is measured at the beginning of step (b). It is observed that in the course of step (b), the pH value raises to at least 10, for example 11 to 13. In embodiments wherein the pH value is in the range of from 10 to 11 at the beginning of step (b) it raises to more than 11 to up to 13. In embodiments wherein the pH value is in the range of 3 to below 10 at the beginning of step (b) it raises to 11 to up to 13 in the course of step (b).

It is preferred that the water hardness of the aqueous medium used in step (b) is at least partially removed, especially calcium. The use of desalinized water is preferred.

In one embodiment of step (b), the aqueous medium used in step (b) may additionally contain ammonia or at least one transition metal salt, for example a nickel salt or a cobalt salt. Such transition metal salts preferably bear counterions that are not detrimental to an electrode active material. Sulfate and nitrate are feasible. Chloride is not preferred. However, it is preferred to treat electrode active material provided in step (a) with water without additives.

In one embodiment of the present invention, step (b) is performed at a temperature in the range of from 5 to 85° C., preferred are 10 to 60° C.

In one embodiment of the present invention, step (b) is performed at normal pressure. It is preferred, though, to perform step (b) under elevated pressure, for example at 10 mbar to 10 bar above normal pressure, or with suction, for example 50 to 250 mbar below normal pressure, preferably 100 to 200 mbar below normal pressure.

Step (b) may be performed, for example, in a vessel that can be easily discharged, for example due to its location above a filter device. Such vessel may be charged with starting material followed by introduction of aqueous medium. In another embodiment, such vessel is charged with aqueous medium followed by introduction of starting material. In another embodiment, starting material and aqueous medium are introduced simultaneously.

In one embodiment of the present invention, the volume ratio of electrode active material and total aqueous medium in step (b) is in the range of from 2:1 to 1:5, preferably from 2:1 to 1:2.

In one embodiment of the present invention, the amounts of water and electrode active material in step (b) have a weight ratio in the range of 5:1 to 1:20, preferably from 1:5 to 1:20, even more preferably from 5:1 to 1:5.

Step (b) may be supported by mixing operations, for example shaking or in particular by stirring or shearing, see below.

In one embodiment of the present invention, step (b) has a duration in the range of from 1 minute to 30 minutes, preferably 1 minute to less than 5 minutes. A duration of 5 minutes or more is possible in embodiments wherein in step (b), water treatment and water removal are performed overlapping or simultaneously.

In one embodiment of the present invention, treatment according to step (b) and water removal according to step (c) are performed consecutively.

After or during the treatment with an aqueous medium in accordance to step (b), water may be removed by any type of filtration, for example on a band filter or in a filter press.

In one embodiment of the present invention, at the latest 3 minutes after commencement of step (b), step (c) is started. Step (c) includes partially removing the water from treated particulate material, for example by way of a solid-liquid separation, for example by decanting or preferably by filtration. Said "partial removal" may also be referred to as partially separating off.

In one embodiment of step (c), the slurry obtained in step (b) is discharged directly into a centrifuge, for example a decanter centrifuge or a filter centrifuge, or on a filter device, for example a suction filter or in a belt filter that is located preferably directly below the vessel in which step (b) is performed. Then, filtration is commenced.

In a particularly preferred embodiment of the present invention, steps (b) and (c) are performed in a filter device with stirrer, for example a pressure filter with stirrer or a suction filter with stirrer. At most 3 minutes after—or even immediately after—having combined starting material and aqueous medium in accordance with step (b), removal of aqueous medium is commenced by starting the filtration. On laboratory scale, steps (b) and (c) may be performed on a Büchner funnel, and steps (b) and (c) may be supported by manual stirring.

In a preferred embodiment, step (b) is performed in a filter device, for example a stirred filter device that allows stirring of the slurry in the filter or of the filter cake.

In one embodiment of the present invention, the water removal in accordance to step (c) has a duration in the range of from 1 minute to 1 hour.

In one embodiment of the present invention, stirring in step (b)—and (c), if applicable—is performed with a rate in the range of from 1 to 50 revolutions per minute ("rpm"), preferred are 5 to 20 rpm.

In one embodiment of the present invention, filter media may be selected from ceramics, sintered glass, sintered metals, organic polymer films, non-wovens, and fabrics.

In one embodiment of the present invention, steps (b) and (c) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform steps (b) and (c) under an atmosphere with a carbon dioxide content below detection limit for example with infrared-light based optical methods.

From step (c), a residue is obtained, preferably, in the form of a wet filter cake. The moisture content of the filter cake may be in the range of from 3 to 20% by weight, preferably 4 to 9% by weight In step (d), the residue from step (c) is treated with a compound of Me, Me being selected from at least one of aluminum, antimony, boron, phosphorus, molybdenum, vanadium, and tellurium. Said compound may be added in bulk or as an aqueous formulation. Examples of aqueous formulations are solutions, slurries and colloidal solutions. Said compound of a Me with Me being selected from aluminum, antimony, boron, phosphorus, molybdenum, vanadium, and tellurium is hereinafter also referred to as "compound of Me" or as "Me compound".

Said aqueous formulation may have a pH value in the range of from 2 up to 14, preferably at least 3.5, more preferably from 5 to 11.

In one embodiment of the present invention, the pH value of the aqueous formulation used in step (d) is controlled by the addition of a basic Li compound, especially of LiOH.

The pH value is measured at the beginning of step (d). Depending on the order of addition of electrode active material, water and compound of Me it is observed that in the course of step (d), the pH value may raise to at least 10, for example 11 to 13. In embodiments wherein the pH value is in the range of from 10 to 11 at the beginning of step (d) it raises to more than 11 to up to 13. In embodiments wherein the pH value is in the range of 3 to below 10 at the beginning of step (d) it raises to 11 to up to 13. It is preferred that the water hardness of said aqueous formulation used in step (d) is at least partially removed, especially calcium. The use of desalinized water is preferred.

Out of compounds of Me, inorganic compounds of Me are preferred.

Of inorganic compounds of Me, water-soluble halides such as chlorides are possible but oxides, hydroxides, sulfates, and lithiated oxides are preferred.

Said inorganic compound of Me may be readily soluble in water. "Water-soluble" in this context means a solubility of at least 10 g of the respective metal/l water at 25° C.

In other embodiments, said inorganic compound of Me is water-insoluble. "Water-insoluble" in this context means a solubility of less than 0.1 g aluminum compound/l water at 25° C. Examples are, e.g., $Al_2O_3$, $Al(OH)_3$, AlOOH, $Al_2O_3 \cdot aq$, preference being given to AlOOH and $Al_2O_3$.

Said water-insoluble compound of Me may be dispersed or slurried in water. In the context of the present invention, AlOOH does not necessarily bear equal molar amounts of oxide and hydroxide and is sometimes also named as Al(O)(OH).

In one embodiment of the present invention, compound of Me is a compound of aluminum, particularly an inorganic compound of aluminum. Inorganic compounds of aluminum and especially $Al_2O_3$ and Al(O)(OH) used in step (d) may be pure (≥99.9 mole % Al, referring to total metals including Si) or doped with oxides such as $La_2O_3$, $Ce_2O_3$, titania or zirconia, in amounts of for example 0.1 to 5 mole %.

In one embodiment of the present invention, said water-insoluble compound of Me has an average particle diameter (D50) in the range of from 200 nm to 5 µm, preferably 2 to 5 µm, dispersed in water and determined by X-ray diffraction.

In one embodiment of the present invention, said compound of Me is provided as colloidal formulation ("colloidal solution"). It is preferred that AlOOH is used as colloidal solution, the average particle diameter being in the range of from 5 to 10 nm, determined from the full width at half maximum ("FWMH") of reflections detected in X-ray diffraction diagrams. Such particles in colloidal solutions may form agglomerates with an average particle diameter in the range of from 20 to 200 nm, preferably 20 to 50 nm. Such colloidal solutions preferably have a pH value in the range of from 5 to 6. As dry powders, agglomerates may be formed with an average particle diameter of up to 15 µm.

Examples of compounds of antimony are compounds of Sb(+III) and of Sb(+V). Examples of compounds of Sb(+III) are $Sb(OH)_3$, $Sb_2O_3 \cdot aq$, $Sb_2(SO_4)_3$, SbOOH, $LiSbO_2$, and $Sb_2O_3$. Examples of compounds of Sb(+V) are $Sb_2O_5$, $LiSb_3O_8$, $LiSbO_3$, $Li_3SbO_4$, $Li_5SbO_5$, $Li_7SbO_6$, $Sb_2O_4$ (Sb(III)Sb(V)O_4$), and oxyhydroxides of Sb(+V) such as, but not limited to $SbO(OH)_3$, $Sb_2O_4(OH)_2$, $Sb_2O_3(OH)_4$, $Sb_3O_6OH$, $Sb_3O_7OH$.

Examples of compounds of boron are boric acid, $B_2O_3$, $Li_3BO_3$, $LiBO_2$, and polyborates of lithium such as, but not limited to $Li_2B_4O_7$. Examples of compounds of vanadium are $V_2O_5$ and $LiVO_3$. Examples of compounds of molybdenum are $MoO_3$ and $Li_2MoO_4$.

Examples of compounds of phosphorus are "$P_2O_5$" ($P_4O_{10}$), $LiPO_3$, $Li_3PO_4$, and preferably lithium hydrogenphosphates such as $LiH_2PO_4$, $Li_2HPO_4$, and mixtures such as $Li_{1.5}H_{1.5}PO_4$ and $Li_{1.16}H_{1.84}PO_4$.

Examples of compounds of Te are $TeO_2$, $TeO_3$, and $Li_2TeO_3$.

In one embodiment of the present invention, said water-insoluble compound of Me has an average particle diameter (D50) in the range of from 200 nm to 10 µm, preferably 2 to 5 µm, dispersed in water and determined by scanning electron microscopy (SEM).

In one embodiment, compound of Me is added in bulk.

In a preferred embodiment, said compound of Me is water-soluble, and it is added in aqueous solution, particularly in an aqueous solution additionally containing LiOH.

In one embodiment, the amount of compound of Me is in the range of from 0.01 to 3.0 mol-%, referring to TM, preferred are 0.1 to 1.0 mol-%.

In one embodiment of step (d), compound of Me in step (d) is selected from $Al_2O_3$, $Sb_2O_3$, $Li_2TeO_3$, $SnO_2$, SnO, or a combination of at least two of the foregoing, dispersed in water.

The treatment in step (d) may be performed by adding the compound of Me to the moisture-containing residue of step (c) and allowing the resultant mixture to interact. Such interaction may be enhanced by stirring.

In one embodiment of the present invention, step (d) is performed at a temperature in the range of from 5 to 85° C., preferred are 10 to 60° C. Ambient temperature is particularly preferred.

In one embodiment of the present invention, step (d) is performed at normal pressure. It is preferred, though, to perform step (d) under elevated pressure, for example at 10 mbar to 10 bar above normal pressure, or with suction, for example 50 to 250 mbar below normal pressure, preferably 100 to 200 mbar below normal pressure.

In one embodiment of the present invention, step (d) is performed in a filter device with stirrer, for example a pressure filter with stirrer or a suction filter with stirrer.

The time of treatment of the residue of step (c) with compound of Me may be in the range of from 2 to 30 minutes.

In one embodiment of the present invention, steps (b) to (d) are performed in the same vessel, for example in a filter device with stirrer, for example a pressure filter with stirrer or a suction filter with stirrer.

The inventive process includes a subsequent step (e):
(e) thermal treatment of the material obtained from step (d).

Step (e) may be carried out in any type of oven, for example a roller hearth kiln, a pusher kiln, a rotary kiln, a pendulum kiln, or—for lab scale trials—in a muffle oven.

The temperature of the thermal treatment according to step (e) may be in the range of from 300 to 900° C., preferably 300 to 700° C. and even more preferably from 550 to 650° C.

The temperature of 350 to 700° C. corresponds to the maximum temperature of step (e).

It is possible to subject the material obtained from step (d) directly to step (e). However, it is preferred to increase the temperature stepwise, or to ramp up the temperature, or to dry the material obtained after step (d) at first at a temperature in the range of from 40 to 80° C. before subjecting it to step (e), or to remove water by a solid-liquid separation method such as filtration.

Said step-wise increase or ramping up may be performed under normal pressure or reduced pressure, for example 1 to 500 mbar.

Step (e)—at its maximum temperature—may be performed under normal pressure.

In one embodiment of the present invention, step (e) is carried out under an oxygen-containing atmosphere, for example air, oxygen-enriched air or pure oxygen.

In embodiments wherein a drying at a temperature in the range of from 100 to 250° C. prior to step (e) is performed such drying may be performed with a duration of from 10 minutes to 5 hours.

In one embodiment of the present invention, step (e) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (e) under an atmosphere with a carbon dioxide content below detection limit for example with infrared-light based optical methods.

In one embodiment of the present invention step (e) has a duration in the range of from 1 to 10 hours, preferably 90 minutes to 6 hours.

In one embodiment of the present invention, the lithium content of an electrode active material is reduced by 1 to 5% by weight, preferably 2 to 4%. Said reduction mainly affects the so-called residual lithium.

By carrying out the inventive process, electrode active materials are obtained with excellent electrochemical properties. Without wishing to be bound by any theory, we assume that the extra compound of Me may lead to scavenging lithium compounds deposited at the surface of the electrode active material.

Without wishing to be bound by any theory, we assume that the surface of the electrode active material is less negatively influenced by the inventive process than by washing processes without compound of Me addition.

A further aspect of the present invention relates to an electrode active material, hereinafter also referred to as inventive electrode active material. Inventive electrode active material is in particulate form has the general formula $Li_{1+x1}TM_{1-x1}O_2$, wherein TM is a combination of Ni, Co and, optionally, Mn, and, optionally, at least one element selected from Al, Mg, Ba and B, and transition metals other than Ni, Co, and Mn, and x is in the range of from −0.05 to zero, wherein said particles are agglomerates from primary particles, wherein at least 60 mole-% of the transition metal of TM is Ni, and wherein a combination of an oxide of Me' with Me' being selected from antimony, molybdenum, vanadium, and tellurium and a lithium oxide species of Me' is evenly distributed between the primary particles.

In a preferred embodiment of the present invention, Me' is Al or Sb or Te, with Te being particularly preferred.

In one embodiment of the present invention, lithiated oxides of Me' such as $LiSbO_2$ or $Li_2TeO_3$ are amorphous.

In one embodiment of the present invention, the outer surface of said particles is uniformly coated with a combination of an oxide of antimony and a lithium oxide species of antimony, and wherein the coating is uniform as detected by EDX mapping ("energy dispersive X-ray mapping).

Such coating is uniform. That means that in TEM, oxide of Me' and lithium oxide species of Me' appear to be evenly distributed over the surface of the primary and secondary particles.

In one embodiment of the present invention, the variable TM corresponds to general formula (I a)

$$(Ni_aCo_bMn_c)_{1-d}M^1_d \qquad (I\ a)$$

with a+b+c=1 and a being in the range of from 0.75 to 0.95, preferably from 0.85 to 0.95, b being in the range of from 0.025 to 0.2, preferably from 0.025 to 0.1, c being in the range of from 0.025 to 0.2, preferably 0.05 to 0.1, d being in the range of from zero to 0.1, preferably from zero to 0.04, $M^1$ is at least one of Al, Mg, W, Mo, Ti or Zr, preferably at least one of Al, Ti and W.

In one embodiment of the present invention, the variable c is zero, $M^1$ is Al and d is in the range of from 0.01 to 0.05.

In another embodiment of the present invention, the variable TM corresponds to general formula (I b)

$$(Ni_{a*}Co_{b*}Al_e)_{1-d*}M^2_{d*} \qquad (I\ b)$$

with a*+b*+c*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Ti or Zr.

The variable x1 is in the range of from −0.05 to 0.15.

In one embodiment of the present invention TM corresponds to general formula (I a) and x is in the range from zero to 0.2, preferably from zero to 0.1 and even more preferably 0.01 to 0.05.

In one embodiment of the present invention TM corresponds to general formula (I b) and x is in the range of from −0.05 to zero.

In one embodiment of the present invention inventive electrode active materials have an average particle diameter (D50) in the range of from 3 to 20 µm, preferably from 5 to 16 µm. The average particle diameter may be determined, e.g., by light scattering or LASER diffraction or electroacoustic spectroscopy. The particles are usually composed of agglomerates from primary particles, and the above particle diameter refers to the secondary particle diameter.

In one embodiment of the present invention inventive electrode active materials have a surface (BET) in the range of from 0.1 to 2.0 m$^2$/g, determined according to DIN-ISO 9277:2003-05.

A further aspect of the present invention refers to electrodes comprising at least one electrode material active according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Cathodes according to the present invention can comprise further components. They can comprise a current collector, such as, but not limited to, an aluminum foil. They can further comprise conductive carbon and a binder.

Suitable binders are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have an average molecular weight $M_w$ in the range from 50,000 to 1,000,000 g/mol, preferably to 500,000 g/mol.

Binder may be cross-linked or non-cross-linked (co)polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$—$O_4$- alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

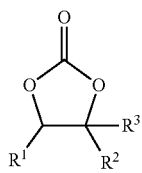

(II)

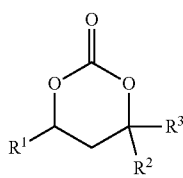

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tertbutyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

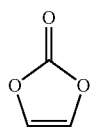

(IV)

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts.

Examples of suitable lithium salts are $LiPF_6$, $LiBF_4$, $LiClO_4$, $LiAsF_6$, $LiCF_3SO_3$, $LiC(CnF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

General remarks: N-methyl-2-pyrrolidone: NMP.

I. Synthesis of a Cathode Active Material

I.1 Synthesis of a Precursor TM-OH.1

A stirred tank reactor was filled with deionized water and 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in a residence time of 8 hours. The transition metal solution contained Ni, Co and Mn at a molar ratio of 8.5:1.0:0.5 and a total transition metal concentration of 1.65 mol/kg. The aqueous sodium hydroxide solution was a 25 wt. % sodium hydroxide solution and 25 wt. % ammonia solution in a weight ratio of 6. The pH value was kept at 12 by the separate feed of an aqueous sodium hydroxide solution. Beginning with the start-up of all feeds, mother liquor was removed continuously. After 33 hours all feed flows were stopped. The mixed transition metal (TM) oxyhydroxide precursor was obtained by filtration of the resulting suspension, washing with distilled water, drying at 120° C. in air and sieving.

I.2 Conversion of TM-OH.1 into a Cathode Active Materials

I.2.1 Manufacture of a Comparative Cathode Active Material, C-CAM.1, Step (a.1)

C-CAM.1 (Comparative): The mixed transition metal oxyhydroxide precursor obtained according to I.1 was mixed with $Al_2O_3$ (average particle diameter 6 nm) to obtain a concentration of 0.3 mole-% Al relative to Ni+Co+Mn+Al and LiOH monohydrate to obtain a Li/(TM+Al) molar ratio of 1.06. The mixture was heated to 760° C. and kept for 10 hours in a forced flow of a mixture of 60% oxygen and 40% nitrogen (by volume). After cooling to ambient temperature the powder was deagglomerated and sieved through a 32 μm mesh to obtain the electrode active material C-CAM 1.

D50=9.0 μm determined using the technique of laser diffraction in a Mastersize 3000 instrument from Malvern Instruments. The Al-content was determined by ICP analytics and corresponded to 780 ppm. Residual moisture at 250° C. was determined to be 300 ppm.

I.2.2 Treatment with $Li_2TeO_3$ in the Presence of Water

Step (b.1): A flask was charged with 67 ml of de-ionized water. An amount of 100 g C-CAM.1 were added. The resultant slurry was stirred at ambient temperature over a period of 5 minutes.

Step (c.1): Then, the water was removed by filtration through a filter press.

Step (d.1): An amount of 4.5 g of $Li_2TeO_3$ aq was added to the filter cake. The molar ratio of Te/(TM+Te) was 0.003. The filter cake with $Li_2TeO_3$ aq was passed into a plastic bag and scrambled for 5 minutes at ambient temperature.

Step (e.1): The resultant filter cake was dried in ultra-dry air at 70° C. for 2 hours and then at 120° C. over a period of 10 hours followed by a thermal treatment at 700° C. for one hour in an atmosphere of oxygen.

Then, by sieving obtained powder with 45 μm sieve, inventive cathode active material CAM.2 was obtained.

Further inventive cathode active materials were made accordingly, by modifying the type and amount of compound of Me. The results are summarized in Table 1.

II. Testing of Cathode Active Material

II.1 Electrode Manufacture, General Procedure

II.1.1 Cathode Manufacture

Positive electrode: PVDF binder (Solef® 5130) was dissolved in NMP (Merck) to produce a 7.5 wt. % solution. For electrode preparation, binder solution (3 wt. %), graphite (SFG6L, 2 wt. %), and carbon black (Super C65, 1 wt.-%) were suspended in NMP. After mixing using a planetary centrifugal mixer (ARE-250, Thinky Corp.; Japan), either any of inventive CAM.1 to CAM.7 or a comparative cathode active material (94 wt. %) was added and the suspension was mixed again to obtain a lump-free slurry. The solid content of the slurry was adjusted to 65%. The slurry was coated onto Al foil using a KTF-S roll-to-roll coater (Mathis AG). Prior to use, all electrodes were calendared. The thickness of cathode material was 70 μm, corresponding to 15 mg/cm². All electrodes were dried at 105° C. for 7 hours before battery assembly.

II.1.2: Pouch Cell Anode Manufacture

Graphite and carbon black were thoroughly mixed. CMC (carboxymethyl cellulose) aqueous solution and SBR (styrene butadiene rubber) aqueous solution were used as binder. The mixture of graphite and carbon black, weight ration cathode active material:carbon:CMC:SBR like 96:0.5:2:1.5, was mixed with the binder solutions and an adequate amount of water was added to prepare a suitable slurry for electrode preparation. The thus obtained slurry was coated by using a roll coater onto copper foil (thickness=10 μm) and dried under ambient temperature. The sample loading for electrodes on Cu foil was fixed to be 10 mg cm$^{-2}$ for single layer pouch cell testing.

II.2: Electrolyte Manufacture

A base electrolyte composition was prepared containing 12.7 wt % of $LiPF_6$, 26.2 wt % of ethylene carbonate (EC), and 61.1 wt % of ethyl methyl carbonate (EMC) (EL base 1), based on the total weight of EL base 1. To this base electrolyte formulation 2 wt. % of vinylene carbonate (VC) was added (EL base 2).

II.3 Test Cell Manufacture

II.3.1 Coin-Type Half Cells

Coin-type half cells (20 mm in diameter and 3.2 mm in thickness) comprising a cathode prepared as described under III.1.1 and lithium metal as working and counter electrode, respectively, were assembled and sealed in an Ar-filled glove box. In addition, the cathode and anode and a separator were superposed in order of cathode/separator/Li foil to produce a half coin cell. Thereafter, 0.15 mL of the EL base 1 which is described above (III.2) were introduced into the coin cell.

II.3.2 Pouch Cells

Single layer pouch cells (70 mA·h) comprising an anode prepared as described above in 111.1.1 and a graphite electrode according to 111.1.2, were assembled and sealed in an Ar-filled glove box. The cathode and the anode and a separator were superposed in order of cathode/separator/anode to produce a several layer-pouch cell. Thereafter, 0.8 mL of the EL base 2 electrolyte were introduced into the Laminate pouch cell.

III. Evaluation of Cell Performance

Evaluation of Coin Half-Cell Performance

Cell performance were evaluated using the produced coin type battery. For the battery performances, initial capacity and reaction resistance of cell were measured.

The initial performance and cycle were measured as follows: Coin half cells according to 11.3.1 were tested in a voltage range between 4.3 V to 2.8 V at room temperature. For the initial cycles, the initial lithiation was conducted in the CC-CV mode, i.e., a constant current (CC) of 0.1 C was applied until reaching 0.01 C. After 10 min resting time, reductive lithiation was carried out at constant current of 0.1 C up to 2.8 V. For the cycling, the current density is 0.1 C. The results are summarized in Table 2.

The cell reaction resistance was calculated by the following method:

The coin cells after the evaluation of the initial performance is recharged to 4.3V, and the resistance is measured by the AC impedance method using potentiostat and frequency response analyzer system (Solartron CellTest System 1470E). From the EIS spectra can be divided into Ohmic resistance and relative resistance. The results are summarized in Table 1. [%] relative resistance is based on the resistance of cell based on C-CAM 1 as 100%

TABLE 1

Manufacturing details and composition of CAM

| CAM | Compound of Me | [mol %] w.r.t. TM | step (e), drying, [° C.] | step (e) calcination, [° C.] |
|---|---|---|---|---|
| C-CAM.1 | none | Zero | 185 | none |
| CAM.3 | $Li_2TeO_3$ | 0.15 | 185 | none |
| CAM.4 | $Li_2TeO_3$ | 0.30 | 185 | none |
| CAM.5 | $Li_2TeO_3$ | 0.60 | 185 | none |
| CAM.6 | $Li_2TeO_3$ | 1.00 | 185 | none |
| CAM.7 | $Li_2TeO_3$ | 0.30 | 185 | 400 |

TABLE 1-continued

Manufacturing details and composition of CAM

| CAM | Compound of Me | [mol %] w.r.t. TM | step (e), drying, [° C.] | step (e) calcination, [° C.] |
|---|---|---|---|---|
| CAM.8 | $Li_2TeO_3$ | 0.30 | 185 | 500 |
| CAM.9 | $Li_2TeO_3$ | 0.30 | 185 | 600 |
| CAM.10 | $Li_2TeO_3$ | 0.30 | 185 | 700 |
| CAM.11 | $Li_2TeO_3 + Al_2O_3$ | 0.30 + 0.30 | 185 | none |
| CAM.12 | $Li_2TeO_3 + Al_2O_3$ | 0.30 + 0.30 | 185 | 700 |
| CAM.13 | $Li_2TeO_3 + Li_2B_4O_7$ | 0.3 + 0.30 | 185 | 700 |
| CAM.14 | $Li_2B_4O_7$ | 0.60 | 185 | none |
| CAM.15 | $Sb_2O_3$ | 0.15 | 120 | none |
| CAM.16 | $Sb_2O_3$ | 0.29 | 120 | none |
| CAM.17 | $Sb_2O_3$ | 0.60 | 120 | none |
| CAM.18 | $Sb_2O_3$ | 1.00 | 120 | none |
| CAM.19 | $Sb_2(SO_4)_3$ | 0.60 | 120 | none |
| CAM.20 | $LiOH + Sb_2(SO_4)_3$ | 0.60 | 120 | none |
| CAM.21 | $Sb_2O_5$ | 0.60 | 120 | none |
| CAM.22 | $Sb_2O_3$ | 0.60 | 120 | 300 |
| CAM.23 | $Sb_2O_3$ | 0.60 | 120 | 400 |
| CAM.24 | $Sb_2O_3$ | 0.60 | 120 | 700 |
| CAM.25 | $Li_2B_4O_7$ | 1.00 | 120 | none |
| CAM.26 | $LiVO_3$ | 0.30 | 185 | none |
| CAM.27 | $Li_2MoO_4$ | 0.30 | 185 | none | w.r.t.: with respect to
CAM.20: pH was 7

TABLE 2

Initial charge and discharge capacity with initial reaction resistance, coin cell

| CAM | $1^{st}$ charge capacity [mA·h/g] | $1^{st}$ discharge capacity [mA·h/g] | Coulombic efficiency [%] | Q25/Q3 [%] | Relative R (impedance) $2^{nd}$ cycle [%] | Relative R (impedance) $26^{th}$ cycle [%] | R $2^{nd}$/R $26^{th}$ [%] |
|---|---|---|---|---|---|---|---|
| C-CAM.1 | 231.6 | 210.0 | 90.7 | 92.2 | 35.2 | 271.5 | 770 |
| CAM.3 | 230.7 | 212.5 | 92.1 | 96.6 | 16.6 | 38.1 | 230 |
| CAM.4 | 231.4 | 212.1 | 91.7 | 97.7 | 10.1 | 20.6 | 204 |
| CAM.5 | 228.8 | 210.2 | 91.9 | 98.0 | 18.8 | 32.2 | 171 |
| CAM.6 | 228.2 | 209.6 | 91.8 | 98.0 | 17.3 | 31.3 | 181 |
| CAM.7 | 233.0 | 215.2 | 92.3 | 96.3 | 13.1 | 39.5 | 302 |
| CAM.8 | 231.0 | 213.2 | 92.3 | 96.8 | 11.4 | 31.6 | 277 |
| CAM.9 | 230.5 | 212.4 | 92.2 | 97.2 | 9.3 | 21.7 | 233 |
| CAM.10 | 232.8 | 208.3 | 89.5 | 98.8 | 9.5 | 14.5 | 152 |
| CAM.11 | 229.3 | 210.4 | 91.7 | 98.3 | 12.6 | 21.4 | 170 |
| CAM.12 | 231.6 | 207.9 | 89.8 | 100.9 | 13.5 | 19.4 | 144 |
| CAM.13 | 230.6 | 207.2 | 89.9 | 97.7 | 24.3 | 63.3 | 260 |
| CAM.14 | 229.9 | 210.6 | 91.6 | 98.4 | 14.3 | 16.9 | 118 |
| CAM.16 | 231.2 | 209.3 | 90.5 | 97.8 | 28.5 | 52.7 | 185 |
| CAM.17 | 229.1 | 210.7 | 92.0 | 98.5 | 22.1 | 18.3 | 83 |
| CAM.18 | 228.7 | 209.3 | 91.5 | 99.4 | 28.3 | 19.5 | 69 |
| CAM.19 | 228.5 | 207.5 | 90.8 | 98.8 | 37.4 | 24.6 | 66 |
| CAM.20 | 229.7 | 210.8 | 91.8 | 98.9 | 19.0 | 16.7 | 88 |
| CAM.22 | 232.8 | 212.2 | 91.1 | 98.6 | 25.7 | 36.3 | 141 |
| CAM.23 | 229.8 | 210.6 | 91.7 | 96.2 | 7.8 | 17.7 | 228 |
| CAM.24 | 230.2 | 205.7 | 89.3 | 98.4 | n.d. | n.d. | n.d. |
| CAM.26 | 231.2 | 208.3 | 90.1 | 93.0 | n.d. | n.d. | n.d. |
| CAM.27 | 231.2 | 212.9 | 92.1 | 93.2 | n.d. | n.d. | n.d. | n.d.: not determined

The invention claimed is:

1. A process for making a partially coated electrode active material wherein the process comprises the following steps:
   (a) providing an electrode active material according to general formula $Li_{1+x}TM_{1-x}O_2$, wherein TM comprises Ni and, optionally, at least one of Co and Mn, and, optionally, at least one element chosen from Al, Mg, Ba and B, transition metals other than Ni, Co, and Mn, and x ranges from −0.05 to 0.2, wherein at least 75 mole-% of the transition metal of TM is Ni,
   (b) treating the electrode active material with an aqueous medium,
   (c) partially removing water by a solid-liquid separation method to create a residue,
   (d) treating the residue with a compound of Me, wherein Me is chosen from at least one of antimony, vanadium, molybdenum, and tellurium, and
   (e) treating the residue thermally.

2. The process according to claim 1, wherein TM is a combination of metals according to general formula (I a)

$$(Ni_aCo_bMn_c)_{1-d}M^1{}_d \quad (I)$$

with
a ranging from 0.75 to 0.95,
b ranging from 0.025 to 0.2,
c ranging from 0.025 to 0.2, and
d ranging from zero to 0.1,
$M^1$ is at least one of Al, Mg, Ti, Mo, W, and Zr, and $$a+b+c=1.$$

3. The process according to claim 1, wherein step (c) is performed by filtration or a centrifuge.

4. The process according to claim 2, wherein $M^1$ is Al.

5. The process according to 1, wherein the aqueous medium in step (b) is water.

6. The process according to claim 1, wherein from step (c), the residue is a moisture-containing filter cake.

7. The process according to claim 1, wherein the compound of Me in step (d) is chosen from $Al_2O_3$, $Sb_2O_3$, $Li_2TeO_3$, and a combination of at least two of the foregoing, dispersed in water.

8. The process according to claim 1, wherein the compound of Me in step (d) is dissolved in water or in an aqueous solution of lithium hydroxide.

9. The process according to claim 1, wherein step (e) comprises a calcination step at a maximum temperature ranging from 300° C. to 700° C.

10. The process according to claim 1, wherein step (e) comprises drying at a maximum temperature ranging from 40° C. to 250° C.

11. The process according to claim 1, wherein in step (b), the amounts of water and electrode active material have a weight ratio ranging from 1:5 to 1:20.

12. A particulate electrode active material according to general formula $Li_{1+x1}TM_{1-x1}O_2$,
   wherein TM is a combination of Ni, Co and, optionally, Mn, and, optionally, at least one element chosen from Al, Mg, Ba and B, and transition metals other than Ni, Co, and Mn, and
   x1 ranges from −0.05 to zero,
   wherein the particles are agglomerates from primary particles,
   wherein at least 75 mole-% of the transition metal of TM is Ni,
   wherein a combination of an oxide of Me' and a lithium oxide species of Me' is evenly distributed between the primary particles; and
   wherein Me' is selected from the group consisting of antimony, molybdenum, vanadium, and tellurium.

13. The particulate material according to claim 12, wherein an outer surface of the particles is uniformly coated with a combination of an oxide of tellurium and a lithium oxide species of tellurium, and wherein the coating is uniform as detected by EDX mapping.

14. The particulate material according to claim 12, wherein TM is a combination of metals according to general formula (I a)

$$(Ni_aCo_bMn_c)_{1-d}M^1{}_d \quad (I)$$

with
a ranging from 0.75 to 0.95,
b ranging from 0.025 to 0.2,
c ranging from 0.025 to 0.2, and
d ranging from zero to 0.1,
$M^1$ is at least one of Al, Mg, Ti, Mo, W and Zr, and $$a+b+c=1.$$

* * * * *